(No Model.)
B. C. TILGHMAN.
CUTTING METALS BY ELECTRICITY.
No. 416,873. Patented Dec. 10, 1889.
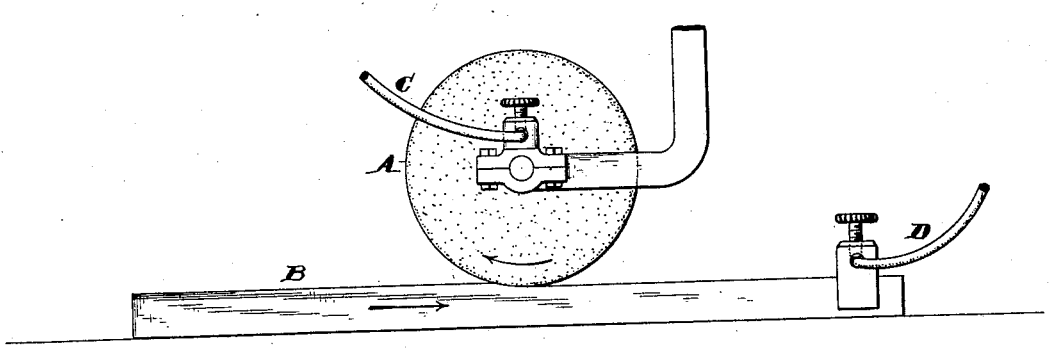
WITNESSES:
INVENTOR:
B. C. Tilghman

UNITED STATES PATENT OFFICE.

BENJAMIN C. TILGHMAN, OF PHILADELPHIA, PENNSYLVANIA.

CUTTING METAL BY ELECTRICITY.

SPECIFICATION forming part of Letters Patent No. 416,873, dated December 10, 1889.

Application filed July 27, 1889. Serial No. 318,835. (No model.)

*To all whom it may concern:*

Be it known that I, BENJAMIN CHEW TILGHMAN, of Philadelphia, Pennsylvania, a citizen of the United States, have invented a new and useful Improvement in Cutting Metals by Electricity, of which the following is a true and exact description.

My invention relates to the cutting or abrading of metals; and the object thereof is to facilitate such operations by successively fusing or softening by an electric current the small portions of the metal operated upon by the cutting or abrading tool employed.

Heretofore metal rods have been severed by passing heavy currents of electricity through the part to be operated upon, so as to heat and soften the bar through its whole section, and then dividing the bar by tensional strain or by the use of ordinary cutting-tools; but my object is to provide a method by which metal objects can not only be severed, but also planed, turned, or shaped in any ordinary way; and I avoid as far as possible heating the metal under treatment except at the point where the cutting or abrading action is taking place. This I accomplish by concentrating the electric current and the abrasion upon a path or continuous series of small spots or points adjoining each other and successively brought under the influence of the current and the abrading-tool, so that the metal is always heated to the desired degree at the point where it is being operated upon and not elsewhere.

In carrying my invention into practice I prefer to use electric currents of large quantity and low intensity, (I do not, however, confine myself thereto,) said currents being either continuous, intermittent, alternating, or undulatory; and I arrange the metal object to be operated upon so as to form one electrode, while the other (preferably the cutting or abrading tool itself) is made to come in contact with the metal object at or substantially at the point where the mechanical cutting action is taking or about to take place, the passage of the current from the one electrode to the other at the point of contact, which is also the point of maximum electrical resistance, softening or fusing the metal at that point and greatly facilitating the operation of cutting. The conductors and electrodes should of course be sufficiently large to offer but little electrical resistance, and they must be properly insulated, so as to confine the current to the point of contact.

As already noted, I prefer to make the cutting-tool itself one of the electrodes, for the obvious reason that in no other as convenient way can the point at which the metal is most highly heated by the current be made to so perfectly coincide with the point where the cutting-tool is acting upon the metal, and what I believe to be the best method of carrying my process into effect is to construct the cutting or abrading tool in the form of a rotating disk made of metal or other conducting material and electrically connected with the source of the current. The metal object to be operated upon is then properly secured to a table, lathe, or other support and electrically connected with the source of supply, and, both electrodes being properly insulated, the edge of the rotating disk is made to press against the surface of the metal object, so as to complete the electric circuit and cause the surface of the object to become heated to softness or fusion at the point or area of contact, while at the same time the friction of the rotating disk scrapes away some of the softened metal and, in case its motion is very rapid, aids by its friction in softening the metal. The metal object operated upon is gradually fed up to the rotating disk, so that a continuous cut is made analogous to that made by a milling-tool, emery-wheel, the tool of a lathe, or the tool of a planing-machine; or of course, instead of feeding the object beneath the disk, the rotating disk may be fed and guided over the surface of the metal object. The surface speed of the rotating disk is much greater than the feed motion of the object operated upon, so that the touching and conducting spot of the disk is constantly being changed, and it is thus subjected to the passage of the current during a much shorter time than is the conducting-spot of the surface operated upon; consequently the disk does not become as hot as that surface, and the temperature of the disk may be lowered by artificial cooling, if desired, as can also the temperature of the object being operated upon. It is desirable that the heating of the spot of metal surface to the proper degree of softness should be done as quickly as possible, so as to minimize the loss of heat by conduction, and the current of electricity used for a given area of contact should be, both in quantity and intensity, amply sufficient for this purpose. Suitable means, such as are well known by electricians, should be provided for measuring and regulating the current.

Reference being now had to the drawings which illustrate my invention, A is a metal disk capable of being rapidly rotated, and connected with the source of electrical supply by a conductor C. The disk is electrically insulated and preferably mounted on a frame, so that it can be moved in any direction, like the tool of a lathe or planing-machine.

B is the metal object to be operated upon. It is connected by a conductor D, so as to form the other electrode for the current. It is insulated and mounted on any convenient table or support, to maintain it in contact with the rotating disk and permit of its proper movements while being operated upon.

It will of course be evident that when the edge of the rotating disk A is brought in contact with the object B, so as to complete the circuit, the current passing through the point of contact will heat to softness or fusion a thin layer of metal, which is immediately scraped or cut away by the friction of the rotating disk, and as the object B is fed up to the rotating disk A a continuous cut will be made as by the tool of a planing-machine, so that of course by giving the proper relative movements to the abrading-tool and the object operated upon the same results will be obtained as in an ordinary planer.

My invention can be applied to lathes, to milling, planing, and grinding machinery, and, generally, to all operations where metal is to be cut or removed and where an abrading-tool can be made to act in combination with an electric current so as to heat successive portions of the metallic surface to softness or fusion.

My process can be applied to all the metals and alloys used in the arts. Hardened steel and chilled cast-iron will be cut or abraded by its use.

I have referred to the cutting-tool which I prefer to employ as a "rotating disk;" but it will of course be understood that any suitable tool having a continuous or alternating motion, like a band-saw or reciprocating saw, might be used, and that the edge of the tool may be smooth or toothed.

Having now described my invention, what I claim as new and desire to secure by Letters Patent, is—

1. The process of cutting or abrading metals which consists in heating by an electric current successive small portions of the metal surface and simultaneously removing the heated metal by an abrading-tool.

2. The process of cutting or abrading metals which consists in passing a current of electricity through the successive points of contact of the metal being treated and the abrading-tool.

3. The process of cutting or abrading metals which consists in passing a current of electricity through the successive points of contact of the metal being treated and a rotating abrading-tool.

B. C. TILGHMAN.

Witnesses:
R. A. TILGHMAN,
B. C. TILGHMAN, Jr.